United States Patent

[11] 3,587,371

[72] Inventor John F. Sherwood
 Glendora, Calif.
[21] Appl. No. 782,834
[22] Filed Dec. 11, 1968
[45] Patented June 28, 1971

[54] EXPANDING ARBOR-COLLET
 13 Claims, 7 Drawing Figs.
[52] U.S. Cl. ................................................ 82/44,
 279/2
[51] Int. Cl. .............................................. B23b 31/40
[50] Field of Search ........................................... 82/44;
 279/2

[56] References Cited
 UNITED STATES PATENTS
 2,459,453 1/1949 Rieber ...................... 82/44X
 2,835,498 5/1958 Howes ...................... 279/2X Primary Examiner—Leonidas Vlachos
Attorney—Bertha L. MacGregor ABSTRACT: An expanding arbor-collet designed to hold work by internal pressure of the arbor within a workpiece, comprising a hollow body and fulcrum means which permit end boring of the workpiece without obstruction by any arbor parts. The fulcrum means is manually movable longitudinally of the body into two positions, one for machining the forward end in preparation for holding the work, and the other for expanding the forward end into work holding engagement. The body has two sets of slots extending inwardly from opposite ends, the slots of one set being located circumferentially between the slots of the other set, whereby a unitary but compressible structure is produced. A concave area on the collet body provides for clamping by a chuck and expansion of the work holding end. An arcuate surface adjacent the expansible portion provides for tangential contact of the arbor with the tapered surface of a chuck or other clamping device.

PATENTED JUN 28 1971 3,587,371

INVENTOR.
John F. Sherwood
BY Bertha L. MacGregor
ATTORNEY

PATENTED JUN28 1971 3,587,371

INVENTOR.
John F. Sherwood
BY Bertha L. MacGregor
ATTORNEY

EXPANDING ARBOR-COLLET

This invention relates to expanding arbor-collets for holding workpieces in machine tools. The arbor is of the internally expanding type designed to hold work by internal pressure of the arbor within the workpiece.

The main object of the invention is to provide means whereby the workpiece may be firmly held on the forward end of the arbor without becoming loosened in the operation of the machine tool.

Another object is to construct the arbor collet in such manner that the workpiece may be subjected to end boring without obstruction by arbor parts. This object is achieved by providing a hollow arbor and collet body, unobstructed by fulcrum ball or web, as found in prior art constructions.

Another object is to provide means for adjustably anchoring fulcrum means whereby to alter the fulcrum plane of the work-holding segments of the arbor. This feature of my invention provides for adjustment of the position of the fulcrum means for two purposes; first, for permitting the forward, work-holding end of the arbor to be machined in preparation for holding a workpiece by internal pressure exerted by the arbor on the work, and secondly, for firmly holding the workpiece on the end of the arbor.

Another object of the invention is to provide means for increasing the resilience of the arbor by employing slots which extend inwardly from opposite ends of the arbor body in circumferentially spaced-apart relationship by which the arbor segments between the slots are maintained in assembled relationship in a unitary but compressible structure.

Another object of the invention is to provide the arbor with arcuate surfaces which produce tangential contact between the said surfaces and the conical surfaces of a chuck in which the device is being used.

Other objects and advantages of the invention will be apparent from the drawings and following description.

Figure 1:
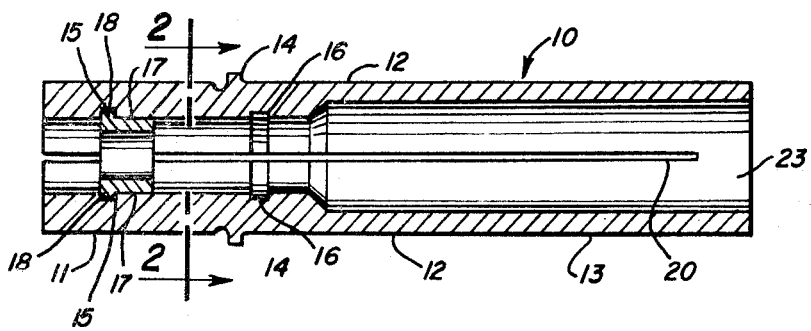
FIG. 1 is a longitudinal sectional view of an arbor-collet embodying my invention, showing the movable fulcrum means in its forward position.
Figure 3:
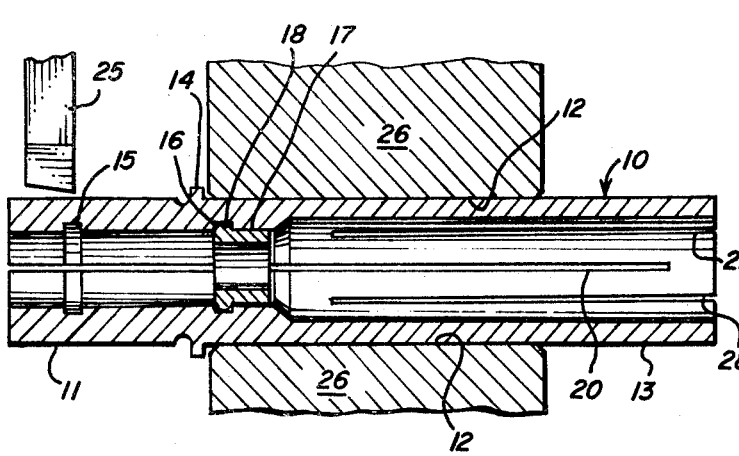

FIG. 3 is a view similar to FIG. 1, showing a modified form of collet body, and showing movable fulcrum means in its rearward position designed for the process of machining the work holding forward end of the arbor to the size of the workpiece to be held thereon in the operation of a machine tool; also showing a cutting tool for machining the work holding end, and chuck jaws of a machine tool engaging the arbor-collet body.

Figure 4:
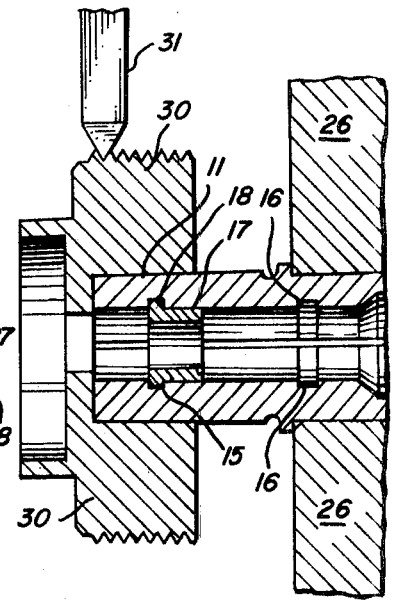

FIG. 4 is a fragmentary view showing the forward end of the arbor-collet of FIG. 3, with a workpiece mounted on the forward end of the arbor and the fulcrum means located in its forward position for expanding the arbor segments into work engaging positions.

Figure 5:
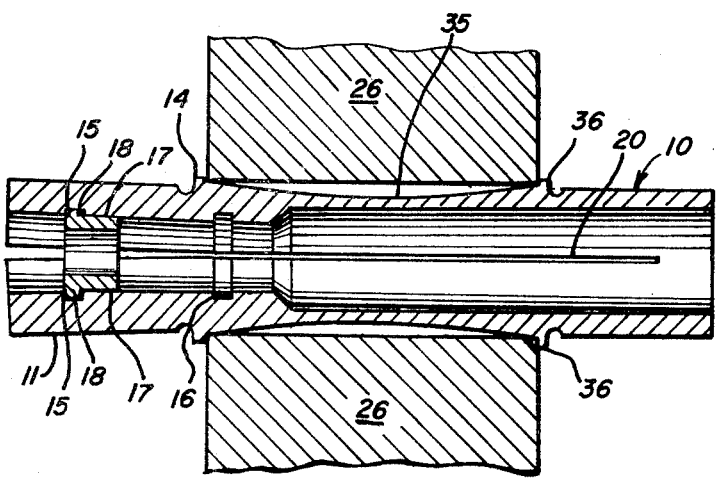

FIG. 5 is a view similar to FIG. 1, showing a modified form of collet body, and a machine tool chuck engaging the body.

Figure 6:
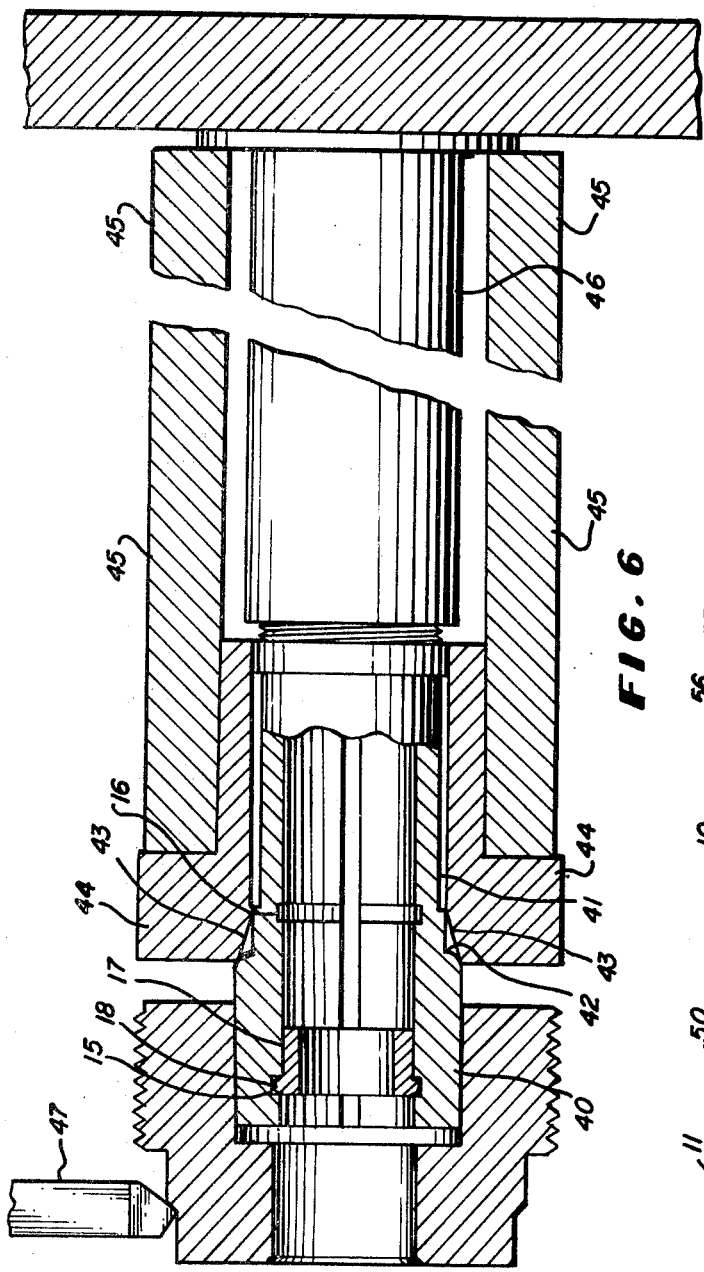

FIG. 6 is a longitudinal sectional view of a modification of the arbor-collet of my invention, showing also a workpiece on the expanding end of the arbor, a lathe spindle engaging the arbor-collet body, a spindle adapter, and a drawbar for drawing the arbor into tight engagement with the spindle adapter; the fulcrum means being in its forward arbor expanding position.

Figure 7:
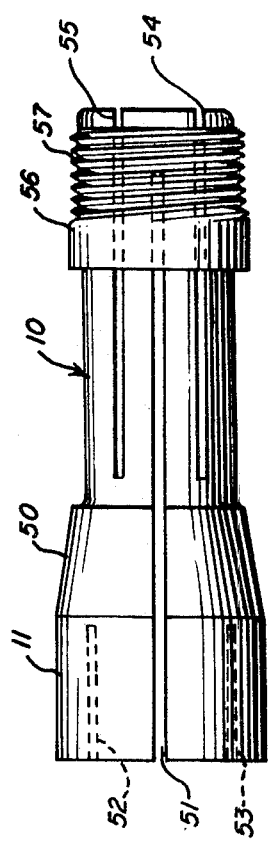

FIG. 7 is an elevational side view of an arbor-collet showing a modified form of the invention in which the arbor has a tapered body, slotted inwardly from opposite ends, and an external bushing is provided for the rearward end of the collet, said bushing being provided with external threads for engagement by a drawbar.

Figure 2:
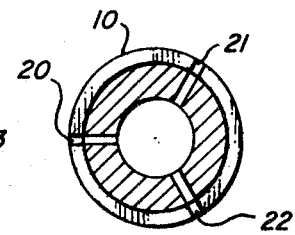
FIG. 2 is a transverse sectional view in the plane of the line 2-2 of FIG. 1.

Referring to FIGS. 1 and 2, the arbor-collet body 10 is a hollow tube comprising a forward work-holding area 11, clamping area 12 and compressible area 13. The area 12 extends from the radial rib 14 rearwardly of the body 10, depending on the width of the clamping chuck, to the compressible area 13. The body 10 is provided internally with annular grooves 15, 16, which alternately receive fulcrum means consisting of a bushing 17 having a radially projecting tongue 18 thereon. The fulcrum means 17, 18, is slidable in the body 10 from one groove 15 or 16 to the other. When in the forward position, the annular tongue 18 engages the groove 15, providing a fulcrum for the expansion of the area 11 into work-engaging position. When in the rearward position, the annular tongue 18 engages the groove 16, providing a fulcrum for the arbor for machining of the work-holding surface.

The tubular hollow body 10 is slotted longitudinally inwardly from its forward end as indicated at 20, 21 and 22, separating the body 10 into three segments which remain integrally connected in the rearward portion 23.

In FIG. 3, the arbor-collet body 10 has the same work-holding area 11, chuck clamping area 12, compressible area 13, and radially extending circumferential rib 14 previously described. It also is provided with interiorly located annular grooves 15 and 16, and with the fulcrum means consisting of the slidable bushing 17 and tongue 18 which enters one or the other of the grooves 15 and 16. In this view, the fulcrum means is located in the rearward groove 16, where it functions to maintain the external surface of the work-holding area 11 in position for machining by a tool such as indicated at 25. A clamping chuck 26 engages the collet body in the area 12.

In the modification shown in FIG. 3, the body 10 is provided with slots 20, 21, 22, such as described, which extend longitudinally inwardly from the forward end of the arbor-collet. It is also slotted longitudinally inwardly from the rearward end, by three slots, two of which are visible and indicated at 27, 28. The slots which extend inwardly from the forward end are located circumferentially between the slots which extend inwardly from the rearward end of the body 10. Each set of slots is shorter than the length of the body 10, leaving segments connected to each other at the inner ends of the slots of each of the two sets of slots, so that the body 10 remains a unitary structure. This arrangement provides the resilience required for efficient operation of the arbor-collet and for maximum expansion capacity for work holding.

FIG. 4 shows parts similar to FIG. 3, except that the bushing 17 with annular tongue 18 has been slidably moved manually from the rearward groove 16 to the forward groove 15, where it provides fulcrum means for expanding the work-holding area 11 for the purpose of holding the workpiece 30 for operation thereon by the tool 31.

The modification shown in FIG. 5 embodies parts heretofore described, designated by the same numerals. The difference is in the shape of the body 10 which is provided with a longitudinally concave circumferential area 35 located between the radially projecting circumferential ribs 14 and 36, for clamping engagement by the chuck 26. The shape of the area 35 permits self-adjustment of the chuck 26 and provides for maximum expansion of the work-holding area 11 by compression of the rearward area 13.

In the modification shown in FIG. 6, the tubular body of the arbor-collet is provided with an enlarged diameter work-holding area 40 which merges into the smaller diameter portion 41 by an arcuate surface 42 which makes tangential contact with the tapered or conical surface 43 of a chuck or spindle adapter 44. The arcuate surface 42 is shaped to provide relative pivotal contact between said surface 42 and the tapered surface 43 when the arbor-collet work-holding area 40 is being expanded, the movement being in the arc of the surface 42 around the proximate edge of the fulcrum means 17. This construction eliminates the possibility of binding contact which might result if the surface 42 were tapered complementally to the surface 43 of the adapter 44. A rotating lathe spindle is indicated at 45 and a drawbar 46.

FIG. 7 shows another form of arbor-collet in which the work-holding area 11 adjoins a tapered area 50. The forward end 11 is provided with three slots 51, 52, 53, extending inwardly from the end. The rearward end is provided with another set of slots of which two are shown in broken lines as indicated at 54, 55. An external bushing 56 is threaded at 57 to fit a drawbar (not shown); the bushing 56 being pressed over the rear slotted end of the collet. By providing a separate bushing 56, the slots of the set which include 54, 55, can extend to the end of the collet 10 and provide maximum flexibility which would not be possible if the bushing 56 were integral with the collet body 10, and thus made the end portion solid and nonflexible.

I claim:

1. An arbor-collet for holding work by internal pressure of the arbor within a workpiece, comprising
   a. a body having a forward work-holding portion and a rearward compressible portion, said body having an axial unobstructed bore extending from one end of the body to the opposite end,
   b. fulcrum means having an axial unobstructed bore extending therethrough in communication with the bore in the body and manually movable longitudinally within the bore of the body, and
   c. means located in the body releasably engaging the fulcrum means for holding it in one of a plurality of selected positions in the body.

2. The arbor-collet defined by claim 1, in which the fulcrum means is an annular bushing provided with a circumferential tongue and the engaging means in the body comprises a pair of spaced-apart grooves for receiving said tongue.

3. The arbor-collet defined by claim 1, in which the arbor body is provided with a plurality of slots some of which extend inwardly from one end of the body to near the opposite end, and others of which extend inwardly from the other end of the body to near the opposite end, said oppositely extending slots being circumferentially spaced from each other leaving unslotted end portions which hold the body parts together as a unitary structure.

4. The arbor-collet defined by claim 1, in which the body is provided externally between its ends with a longitudinally concave surface for engagement by a machine tool chuck.

5. The arbor-collet defined by claim 1, in which the forward work-holding portion is larger in diameter than the rest of the body and merges into said body by an arcuate surface which provides tangential contact with a tapered surface on an adapter or other holding device with which the arbor-collet may be used in a machine tool.

6. An arbor-collet for holding work by internal pressure of the arbor within a workpiece, comprising
   a. a hollow tubular body having a forward work-holding portion, an adjacent clamping area of substantial axial width, and a rearward compressible portion, said body having an axial unobstructed bore extending from one end of the body to the opposite end, and
   b. sleeve-form fulcrum means in the body having a bore extending therethrough in axial alignment with the bore in the body which permits end boring of a workpiece from either end of the arbor-collet without obstruction by any arbor parts.

7. The arbor-collet defined by claim 6 in which fulcrum means is an annular bushing provided with a tongue, and the arbor body is internally grooved to receive the tongue and hold the fulcrum means in the body.

8. The arbor-collet defined by claim 6, in which the fulcrum means is manually movable in the bore of the body and which includes retaining means located in the body for releasably retaining the fulcrum means in one of a plurality of selected positions.

9. The arbor-collet defined by claim 6, in which the fulcrum means is manually movable in the bore of the body and which includes a pair of spaced-apart grooves in the body for receiving and releasably retaining the fulcrum means in one of a plurality of selected positions.

10. The arbor-collet defined by claim 6, in which the arbor body is provided with a plurality of slots some of which extend inwardly from one end of the body to near the opposite end, and others of which extend inwardly from the other end of the body to near the opposite end, said oppositely extending slots being circumferentially spaced-apart from each other leaving unslotted end portions which hold the body parts together as a unitary compressible structure.

11. The arbor-collet defined by claim 6, in which the body is provided externally between its ends with a longitudinally concave surface for engagement by a machine tool chuck.

12. The arbor-collet defined by claim 6, in which the forward work-holding portion merges into the rest of the body by an arcuate surface which provides tangential contact with any device with which the arbor-collet may be used in a machine tool.

13. The arbor-collet defined by claim 10, which includes a separate externally threaded bushing pressed on the rearward slotted end of the collet; permitting compression of the slotted end of the collet.